(12) United States Patent
Costanzo et al.

(10) Patent No.: US 12,509,279 B2
(45) Date of Patent: Dec. 30, 2025

(54) SORTATION INTO VOLUME-ADJUSTABLE CONTAINERS

(71) Applicant: Laitram, L.L.C., Harahan, LA (US)

(72) Inventors: Mark Costanzo, New Orleans, LA (US); Bryant G. Ragan, Metairie, LA (US); Christopher Alan Brupbacher, New Orleans, LA (US); Destin Jacob Bailey, Marrero, LA (US)

(73) Assignee: Laitram, L.L.C., Harahan, LA (US)

(*) Notice: Subject to any disclaimer, the term of this patent is extended or adjusted under 35 U.S.C. 154(b) by 217 days.

(21) Appl. No.: 18/269,412

(22) PCT Filed: Dec. 9, 2021

(86) PCT No.: PCT/US2021/062615
§ 371 (c)(1),
(2) Date: Jun. 23, 2023

(87) PCT Pub. No.: WO2022/150143
PCT Pub. Date: Jul. 14, 2022

(65) Prior Publication Data
US 2024/0051709 A1     Feb. 15, 2024

Related U.S. Application Data

(60) Provisional application No. 63/135,326, filed on Jan. 8, 2021.

(51) Int. Cl.
*B65D 21/08* (2006.01)
*B62B 3/02* (2006.01)
*B65D 25/02* (2006.01)
*B65G 47/44* (2006.01)

(52) U.S. Cl.
CPC ............. *B65D 21/08* (2013.01); *B62B 3/02* (2013.01); *B65D 25/02* (2013.01); *B65G 47/44* (2013.01); *B62B 2203/13* (2013.01); *B65G 2203/0283* (2013.01)

(58) Field of Classification Search
None
See application file for complete search history.

(56) References Cited

U.S. PATENT DOCUMENTS

| 6,000,770 | A | 12/1999 | Frich | |
| 6,364,330 | B1* | 4/2002 | Weber | B62B 3/004 |
| | | | | 187/244 |
| 11,027,922 | B1* | 6/2021 | Kayal | B65G 47/44 |
| 11,033,935 | B2 | 6/2021 | Czukor et al. | |
| 11,453,424 | B2* | 9/2022 | Coats | B62B 5/0079 |

(Continued)

FOREIGN PATENT DOCUMENTS

| DE | 2358331 A1 | 7/1975 |
| DE | 29513324 U1 | 12/1996 |

(Continued)

*Primary Examiner* — Kavel Singh
(74) *Attorney, Agent, or Firm* — James T. Cronvich

(57) ABSTRACT

A sorting conveyor system sorting parcels into volume-adjustable containers with movable floors and an associated method for adjusting the depth of the container's interior volume. The containers are mounted on carts and have movable floors that are raised and lowered to decrease and increase the depth of the container's interior volume below an upper rim as a function of the load of parcels in the container.

23 Claims, 10 Drawing Sheets

(56) References Cited

U.S. PATENT DOCUMENTS

| | | | |
|---|---|---|---|
| 11,472,642 B2* | 10/2022 | Fourney | B65D 88/62 |
| 11,660,641 B2* | 5/2023 | Kincaid | B07C 3/08 |
| | | | 209/703 |
| 11,905,125 B1* | 2/2024 | Coats | B65G 65/00 |
| 2017/0275105 A1 | 9/2017 | Porat et al. | |
| 2017/0361176 A1 | 12/2017 | Sherr | |
| 2022/0017311 A1 | 1/2022 | Fourney et al. | |

FOREIGN PATENT DOCUMENTS

| | | |
|---|---|---|
| EP | 2295155 A1 | 3/2011 |
| KR | 20190072504 A | 6/2019 |
| WO | 2020086329 A1 | 4/2020 |
| WO | 2020173247 A1 | 9/2020 |

\* cited by examiner

SORTATION INTO VOLUME-ADJUSTABLE CONTAINERS

BACKGROUND

The invention relates generally to power-driven conveyors and in particular to sorting parcels into volume-adjustable containers.

Parcels come in various sizes, shapes, and weights. Accurately sorting a variety of parcels at high throughput rates poses challenges for automation. Manual intervention is required to correct mis-sorted parcels and to efficiently pack sorted parcels in parcel containers.

SUMMARY

One version of a cart for receiving parcels comprises a base, a frame upstanding from the base, and a container supported by the frame. The container has a lower floor and an upper rim bounding a mouth opening into an interior volume between the upper rim and the lower floor. A mover attached to the floor moves the floor toward or away from the upper rim to adjust the depth of the interior volume of the container.

One version of a conveyor system for sorting parcels comprises a diverting conveyor conveying parcels along its length and a plurality of discharges having entrance and exit ends and disposed along one or both sides of the diverting conveyor at spaced apart discharge locations. The discharges receive parcels diverted from the diverting conveyor over the entrance end and discharge the parcels off the exit end. Carts positioned proximate the exit ends of the discharges receive parcels discharged from the discharges over the exit ends. The carts each include a container having an upper rim and a lower floor that is movable to adjust the depth of an interior volume of the container as a function of the volume of parcels in the container.

One version of a method for adjusting the depth of an interior volume of a container receiving parcels comprises: (a) positioning a container having a movable lower floor and an upper rim suspended from a frame to receive parcels from the conveyor into an interior volume of the container; and (b) adjusting the distance of the floor from the rim to set the depth of the interior volume as a function of the load of parcels in the container.

DETAILED DESCRIPTION

Figure 1:
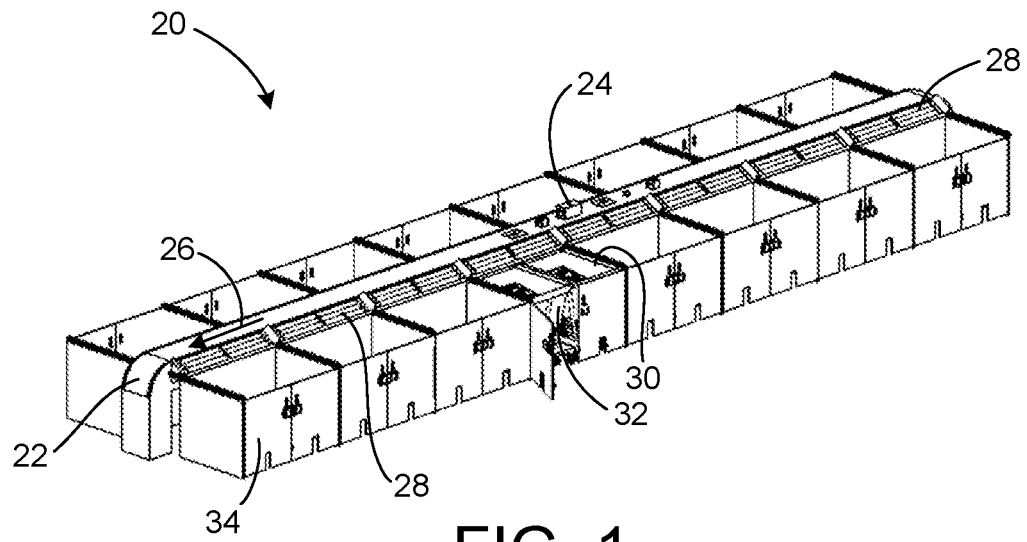
FIG. 1 is an isometric view of a conveyor system for sorting parcels into containers.

A sorting conveyor system for sorting parcels into containers, such as bags, is shown in FIG. 1. The sorting conveyor system 20, or sorter, comprises a diverting conveyor 22 conveying a variety of parcels 24 in a main conveying direction 26. Discharges 28 are arranged at spaced apart sort positions along both sides of the diverting conveyor 22. The diverting conveyor selectively diverts parcels 24 off the diverting conveyor and onto the discharges 28 depending on the parcel's assigned destination. The discharges 28 deposit the parcels 24 in bags 30 supported on carts 32. The carts 32 are enclosed in enclosures 34 along the sides of the diverting conveyor 22.

The diverting conveyor 22 can be an activated roller-belt conveyor using a belt such as an INTRALOX® Series 7000 belt or a Series 4550 Bidirectional Dual-Stacked Angled Roller (DARB) belt for bilateral sorting to the discharges 22. For unilateral sorting, a roller belt such as an INTRALOX® Series 4500 DARB belt can be used as the diverting conveyor instead. But standard, non-roller belts, slat conveyors, or roller conveyors can be used as the diverting conveyor 22 in conjunction with diverting mechanisms, such as gates, pushers, and cross-belt sorters to divert parcels 24 onto the discharge 28. Shoe sorters may also be used to realize the diverting conveyor 22.

Figure 2:
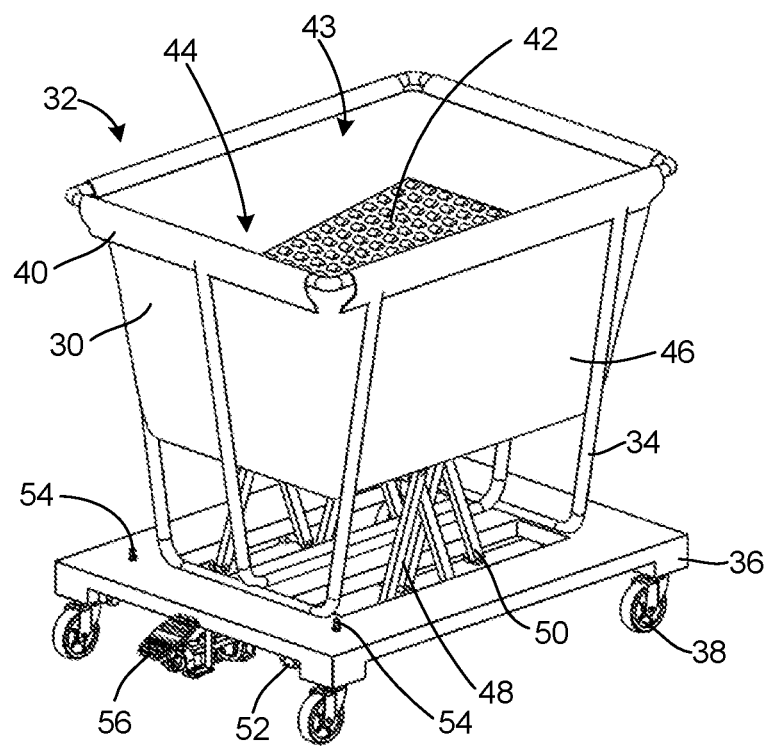
FIG. 2 is an isometric view of a cart supporting one version of a volume-adjustable parcel bag usable in a conveyor system as in FIG. 1.

The discharges 28 deposit the parcels 24 in bags 30 on carts 32. Although the illustrative containers are bags, other containers are usable. A cart 32 is shown in more detail in FIG. 2. The bag 30 is supported by a frame 34 standing up from a base 36 of the cart 32. Caster wheels 38 are mounted at the bottom of the base at its four corners. The bag 30 extends in depth from a top, or upper, rim 40 to a lower floor 42. The top, or upper, rim 40 bounds a mouth 43 opening into an interior volume 44. The interior volume 44 extends downward from the top, or upper, rim 40 and is bounded by the floor 42 and the side wall 46 of the bag 30. The floor 42 is movable vertically and is used to adjust the depth of the interior volume 44 of the bag 30. A mover 48 supported on the cart's base 36 and attached to the floor 42 moves the floor toward and away from the rim 40. The mover 48 shown in this example includes a scissor lift 50 mounted to the base 36 at one end and to the bottom of the floor 42 at the other end. A pneumatic actuator 52 controls the scissor lift 50 to raise and lower the floor 42. Quick-connect air couplings 54 on each side of the base 36 enable rapid and convenient connection to a source of compressed air to either coupling. A foot pedal 56 or hand-operated switch provides manual control of the pneumatic mover 48.

Figure 3A:
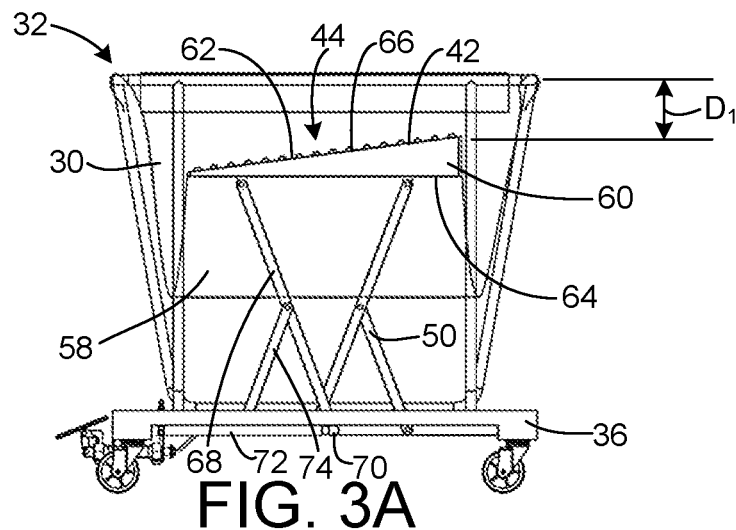
FIGS. 3A-3C are side elevation views showing the parcel bag of FIG. 2 with its floor at three different positions.
Figure 3B:
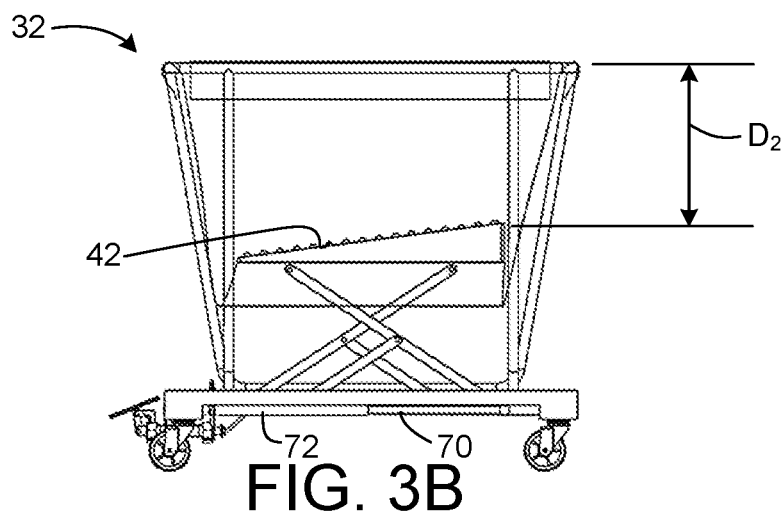
Figure 3C:
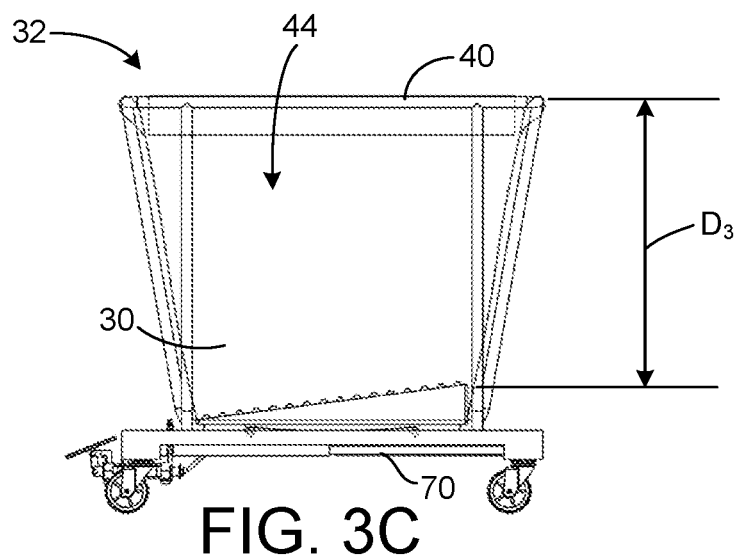

FIGS. 3A-3C show a sequence of lowering the floor 42 of the bag 30, which is shown as transparent to better demonstrate the operation of the movable-floor system. The bag 30 could even be made of a transparent material or with a transparent side wall or window in a side wall to make the bag's contents visible from the side. The bottom of the bag's flexible sides 58 are attached to the floor 42. As shown in this example, the floor 42 is formed on a rigid wedge 60. The floor 42 is formed by an upper ramp face 62 of the wedge. The lower face 64 of the wedge 60 is generally horizontal. Freely-rotatable rollers 66 extend from the floor 42 into the interior volume 44 of the bag 30. The tilt of the floor 42 and the floor rollers 66, alone or together, enable parcels to move down the ramp 60 away from the landing area to minimize collisions and stacking and create a more uniform distribution of parcels in the bag 30 and to aid the unloading of parcels from the bag.

In FIG. 3A the floor 42 is shown in an upmost position providing a minimum depth $D_1$ of the interior volume 44 of the bag 30. In that position of the floor 42, the scissor lift 50 is in a fully extended state. The scissor lift 50 shown in this example is formed by four Scott-Russell-linkages, each constructed of a long linkage 68 connected to the floor 42 at one end and to the end of a piston arm 70 of a pneumatic actuator cylinder 72. Instead of being pneumatic actuators, the actuators can be rack-and-pinion gear systems or lead-screw systems driven by electric motors. In that case the air couplings would be replaced by electrical connectors. Or linkage actuation could be fully manually implemented with a foot-pump hydraulic actuator. A short linkage 74 is connected at one end to the middle of the long linkage 68 and to a fixed pivot on the base 36 of the cart 32 at the other end. In FIG. 3A, with the scissor lift 50 extended, the cylinder's piston arm 70 is maximally retracted into the cylinder 72.

As parcels are added to the bag 30, the floor 42 is dropped manually or automatically to a greater depth D2 as shown in FIG. 3B to increase the volume of the bag. In this position of the floor 42, the cylinder 72 has extended its arm 70 to lower the linkages 68, 74 and the floor 42. FIG. 3C shows the floor 42 in a lowermost position at the maximum depth D3 below the rim 40 for a large load of parcels in the interior volume 44 of the bag 30. In the lowermost position of the floor 42, the cylinder's arm 70 is fully extended, collapsing the Scott-Russell linkages 68, 74 to provide a maximum volume of the bag 30. All the attachment points of the linkages 68, 74 are pivotable connections.

Figure 4:
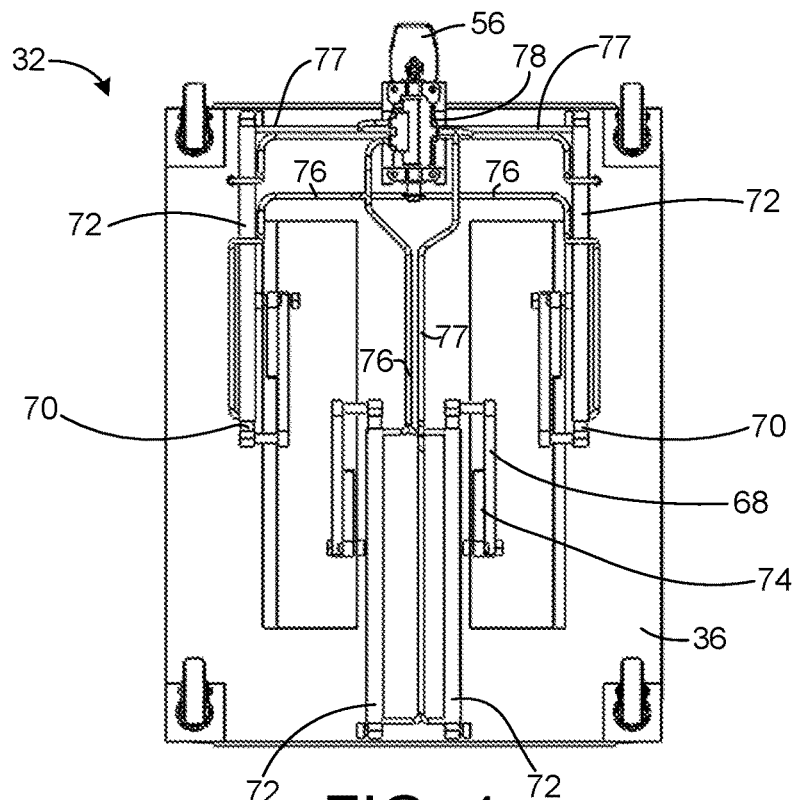
FIG. 4 is a bottom view of the cart of FIG. 2 showing a pneumatic mover for the floor of FIGS. 3A-3C.
Figure 5:
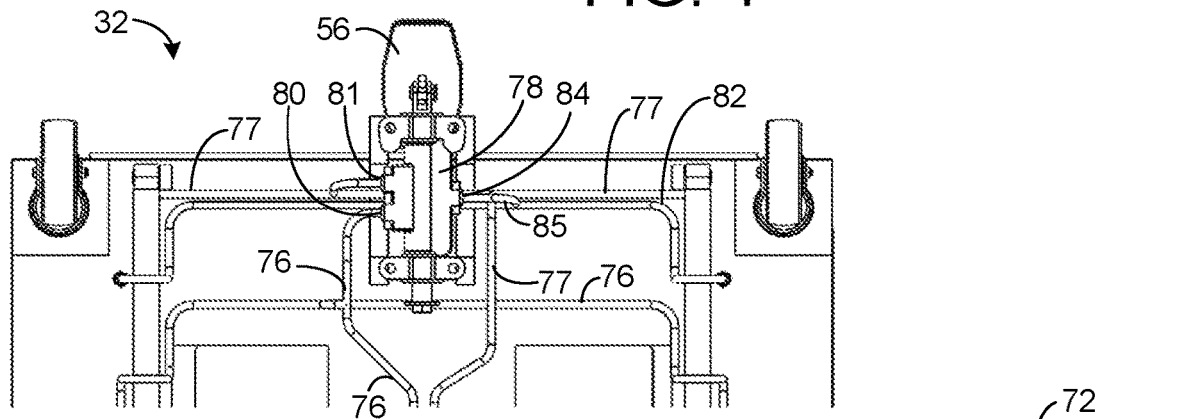
FIG. 5 is an enlarged bottom view of a portion of the cart of FIG. 4.
Figure 6:
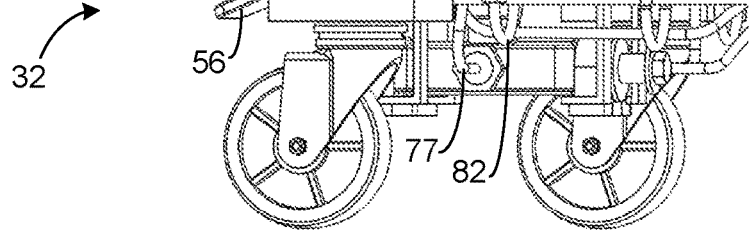
FIG. 6 is an enlarged side view of a portion of the cart of FIG. 4.

Further details of the pneumatic actuating system are shown in FIGS. 4-6. The four sets of Scott-Russell linkages 68, 74 are each controlled by a dedicated actuating cylinder 72 and piston arm 70 mounted to the bottom of the base 36 of the cart 32. The arms 70 are shown retracted in FIG. 4. The cylinders 72 are double-acting cylinders with up air lines 76 connected to first ends of each cylinder and down air lines 77 connected to opposite second ends. The other ends of the up and down control lines are attached to up and down ports 80, 81 of a flow divider valve 78. An input air line 82 connects to the flow divider's input port 84 via a T-junction stub line 85 and to the air couplings 54 at each side of the cart's base 36. A check valve 86 at each air coupling 54 provides a one-way path for air into the flow divider 78. The flow divider 78 divides the input air line's flow into the input port 84 between the up and down ports 80, 81.

In a manual operating mode, the foot pedal 56 sets the percentage of air directed to each port 80, 81, When the pedal 56 is raised to its topmost position, 100% of the air is directed to up air lines 76. When the pedal 56 is lowered to its bottommost position, 100% of the air is directed to the down air lines 77. Between those two positions, the air supply is divided according to the position (or angle) of the pedal.

In an automatic operating mode, the foot pedal 56 is placed in its topmost position so that 100% of the air supply is directed to the up air lines 76. The air in the down air lines 77 is allowed to bleed off. In that way the cylinders 70 are effectively connected with one-way cylinders that can be controlled merely by adjusting the air pressure in the input air line 84, which is controlled by the sorting conveyor system's controller.

Figure 7A:
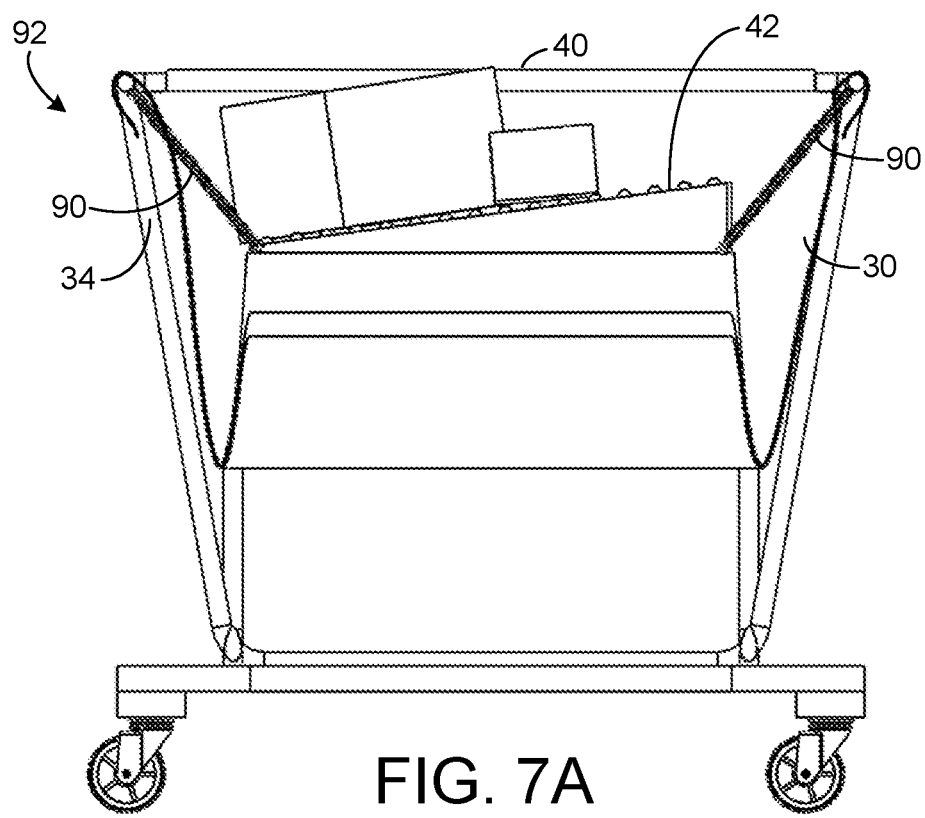
FIGS. 7A and 7B are side elevation views of another version of bag and cart usable in a conveying system as in FIG. 1 shown in lightly and heavily loaded conditions.
Figure 7B:
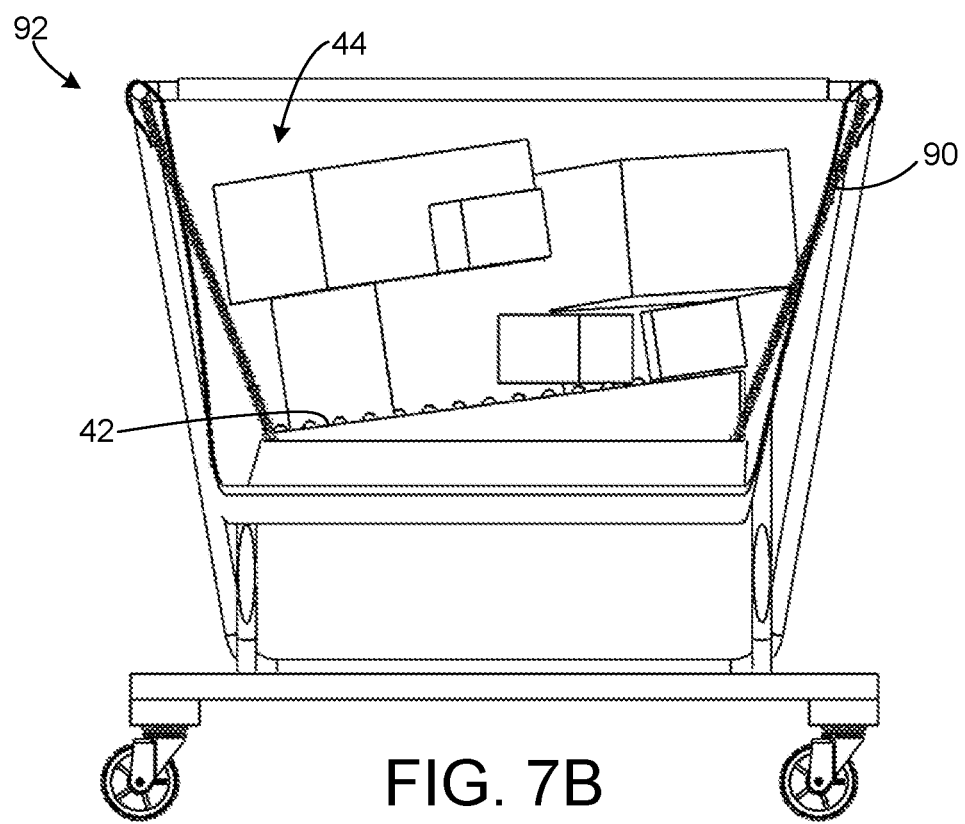
Figure 8A:
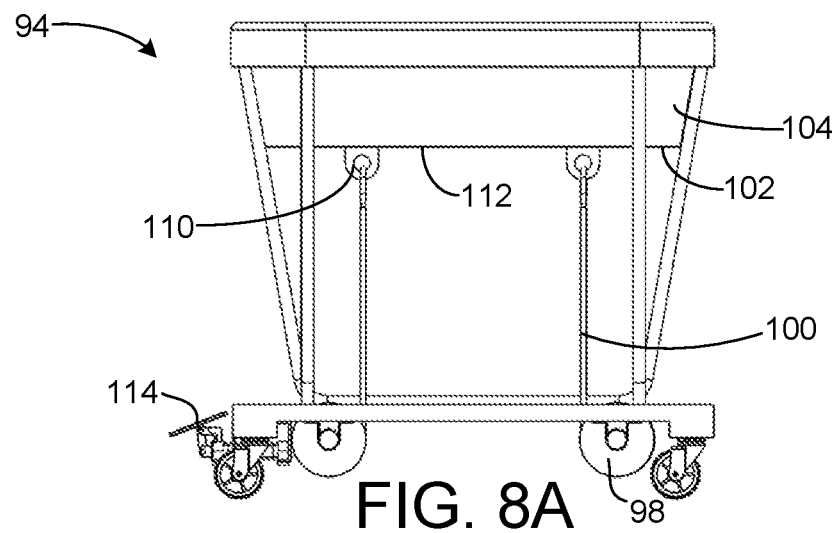
FIGS. 8A-8C are side elevation views of yet another cart and bag usable in a conveyor system as in FIG. 1 with the floor shown at three different levels.
Figure 8B:
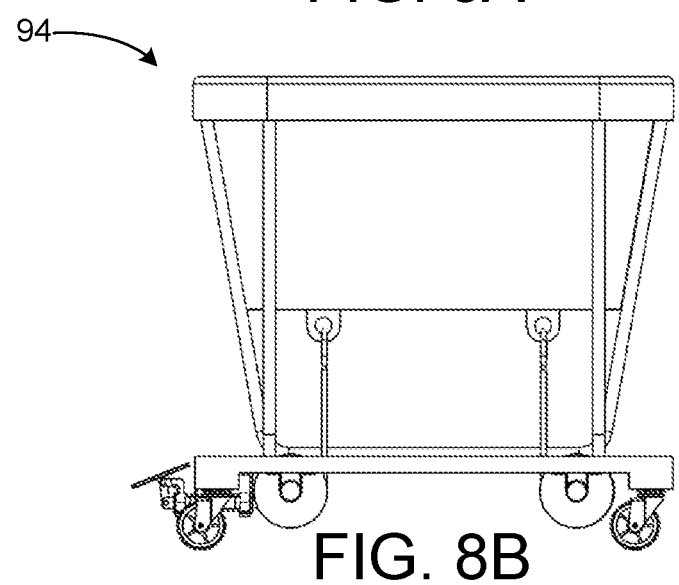
Figure 8C:
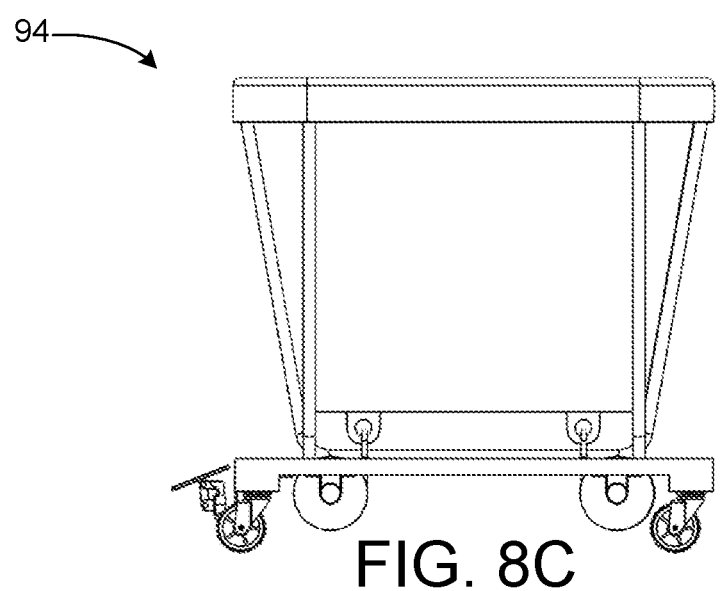
Figure 9:
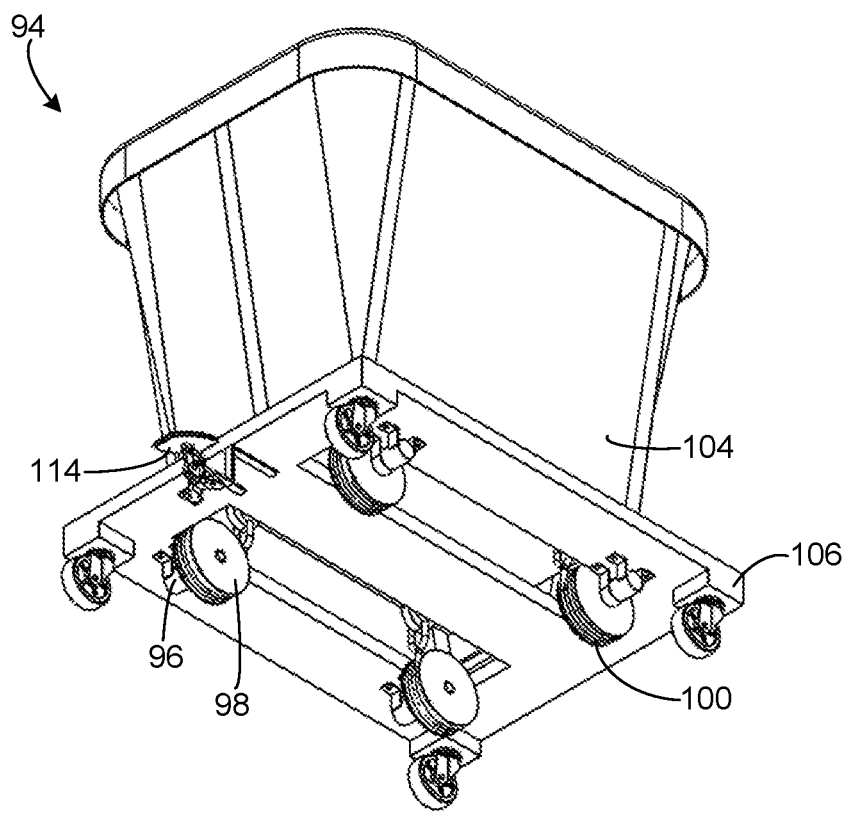
FIG. 9 is a bottom isometric view of the cart and bag of FIGS. 8A-8C showing a winch to control the bag's floor level.
Figure 10:
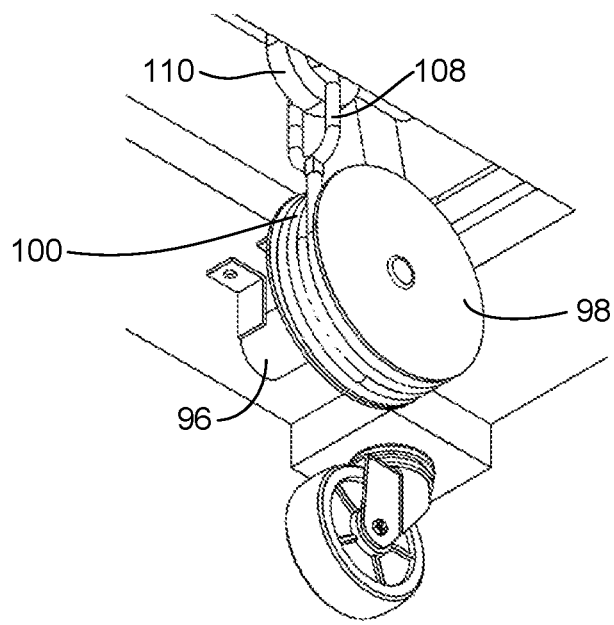
FIG. 10 is an enlarged view of a portion of the bottom of the cart of FIG. 9 FIGS. 11A and 11B are isometric views of a conveyor system as in FIG. 1 with discharge rollers shown in operational and maintenance states.

Another version of a cart and bag is shown in FIGS. 7A and 7B. In this version, the floor 42 is attached at its bottom to one end of springs 90 at each corner. The other ends of the springs 90 attach to the frame 34 at its top corners. The springs 90 bias the floor 42 toward the top rim 40 of the bag 30. When the floor 42 supports a light parcel load as in FIG. 7A, the weight of the parcels stretches the springs 90 only slightly to lower the floor a small distance from the rim 40. As the parcel load increases, the increased weight stretches the springs 90 further and lowers the floor 42 as shown in FIG. 7B. When the bag 30 is emptied of parcels, the spring force raises the floor 42 to a topmost position, minimizing the depth of the interior region 44. Thus, the springs 90 serve as movers that raise the floor 42 and allow the floor to be lowered to a level that depends on the parcel load. In this passive spring-based mover, no pneumatics or other active components are required. So the cart 92 does not include the air lines and couplings, the foot pedal, or the scissor lift of the cart of FIG. 2.

Yet another version of a cart is shown in FIGS. 8A-8C, 9, and 10. In this version the cart 94 has a mover in the form of winches that each comprise a motor 96, a pulley 98 driven by the motor, and a cable 100 wound around the pulley. The winches' cables 100 are attached to a floor 102 at the bottom of a bag 104 made of a resilient, stretchable material, such as elastic latex webbing or Lycra® spandex. The motors 96 and pulleys 98 are mounted to the bottom of the cart's base 106 below the corners of the bag 104. Each cable 100 is wound around its pulley 98. Each cable 100 terminates with a coupling link 108 attached to a pad eye 110 at the bottom of the floor 112 of the bag 104. As parcels are loaded into the bag 104, the depth of the internal volume of the bag is increased by the winches' lowering of the floor 112. The winch motors 96 reel in the cables 100 on the pulleys 98 to lower the floor 112 and stretch the resilient bag 104 from an unstretched state in FIG. 8A to a fully stretched state in FIG. 8C as the sequence depicted in FIGS. 8A-8C. When the bag 104 is emptied of parcels, the bag's resilience, like a spring, raises the floor 112, returning the bag to its unstretched state as in FIG. 8A. The winch motors 96 can be controlled with a foot pedal 114 or remotely from the sorter controller via wire or over a wireless link. Power to the winches is provided over a power cable (not shown). The winch motor can be a dc motor driven by a motor controller, such as pulse-width-modulated (PWM) motor controller. The winches can alternatively be used with the spring-loaded bag 30 of FIGS. 7A and 7B.

Figure 11A:
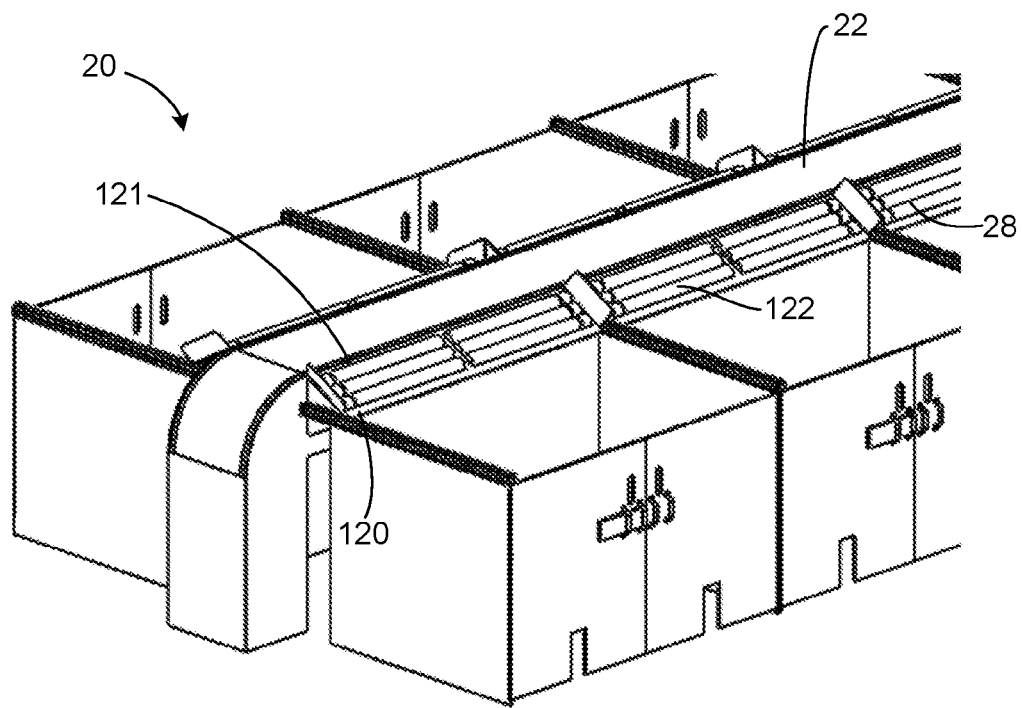
Figure 11B:
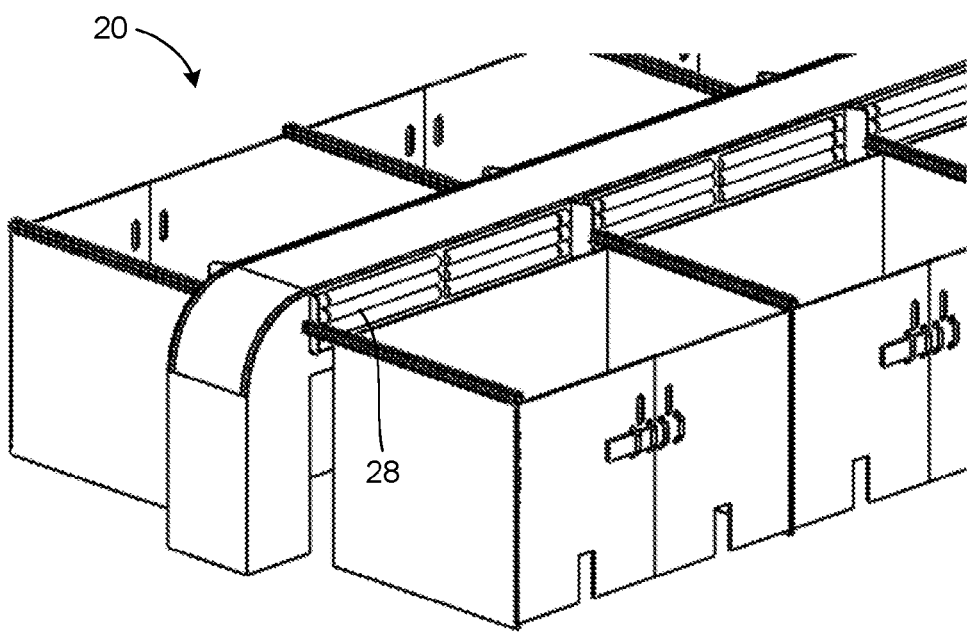

More details of the sorting conveyor system are shown in FIGS. 11A and 11B. FIG. 11A shows an end portion of the sorting conveyor 20 of FIG. 1 in an operational state in which the exit ends 120 of the discharges 28 are raised to direct parcels to the parcel bags. The discharges 28 are hinged at upper entrance ends 121 so that they can be folded down as in FIG. 11B for maintenance in a maintenance state. The discharges 28 are shown as roller conveyors with a series of powered rollers 122 arranged to rotate in a direction away from the diverting conveyor 22 and toward the cart bags. The speed of the powered rollers 122 can be varied to control the landing area of the parcels in the bags. The discharges shown tilt downward from the diverting conveyor 22, but they could be horizontally arranged. Furthermore, the rollers could be unpowered gravity rollers instead. Or the discharges could be realized as chutes or belt conveyors, as further examples.

Figure 12:
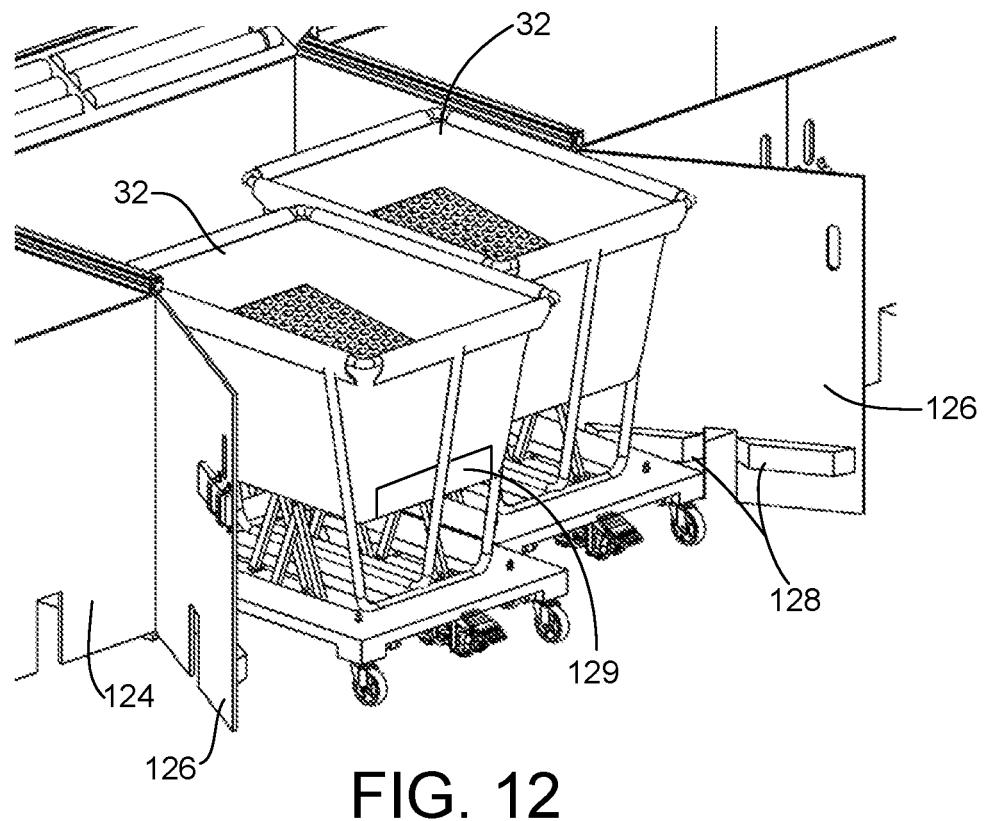
FIG. 12 is an isometric view of two carts with bags entering an enclosure in the conveyor system of FIG. 1.
Figure 13:
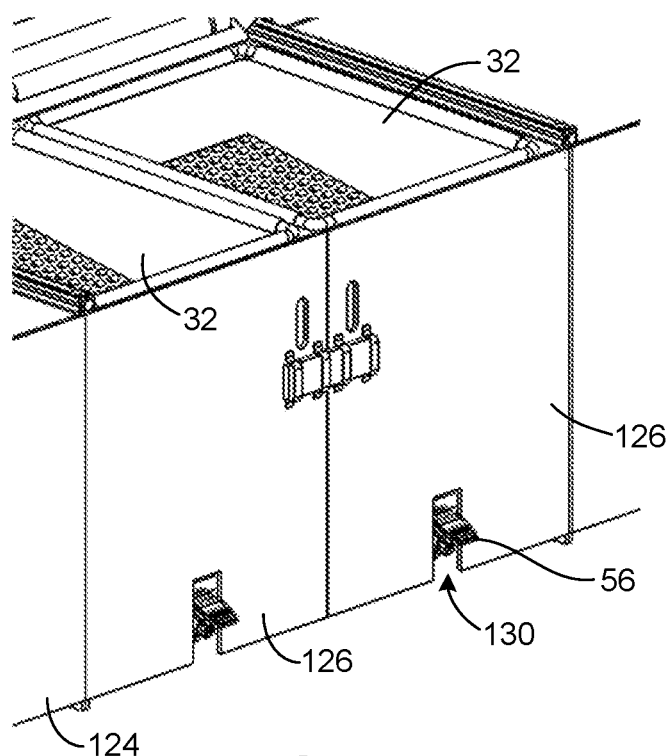
FIG. 13 is an isometric view as in FIG. 12 with the enclosure doors closed and the cart and bag in an operational mode.

Cabinet enclosures 124 house the carts 32 as shown in FIGS. 12 and 13. In this example each walled enclosure 124 houses two side-by-side carts 32. In FIG. 12, two empty carts 32 are shown entering the enclosure 124 through a pair of doors 126. Bumpers 128 on the inside of the doors 126 cushion the carts 32 in the enclosures 124 when the doors are closed as in FIG. 13. Each door 126 has a slot 130 at the bottom through which the cart's foot pedal 56 can extend. A maintenance flap 129 at the bottom of the bag below the floor provides maintenance personnel easy access to remove small parcels that may have slipped between the sides of the bag and the floor. The flap 129 can be held in place by snaps, magnets, or Velcro®, for example.

Figure 14:
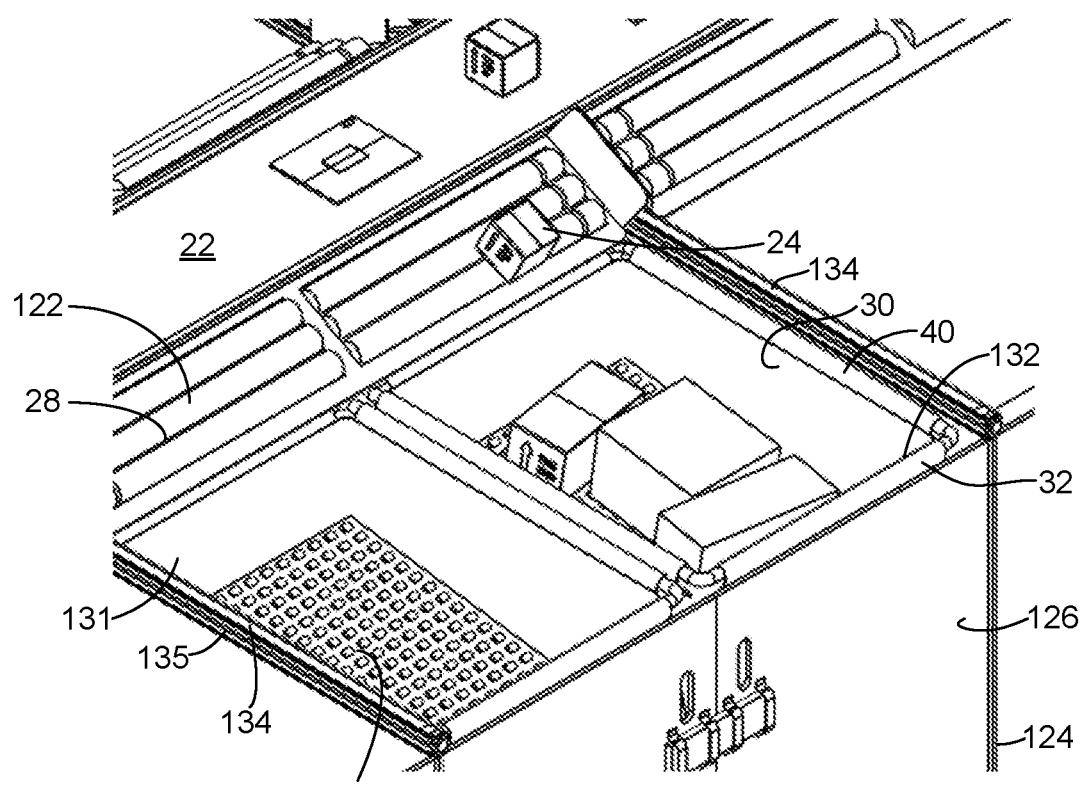
FIG. 14 is an enlarged view of the conveyor system of FIG. 1 showing the deposit of parcels into a bag in a latched enclosure.
Figure 15:
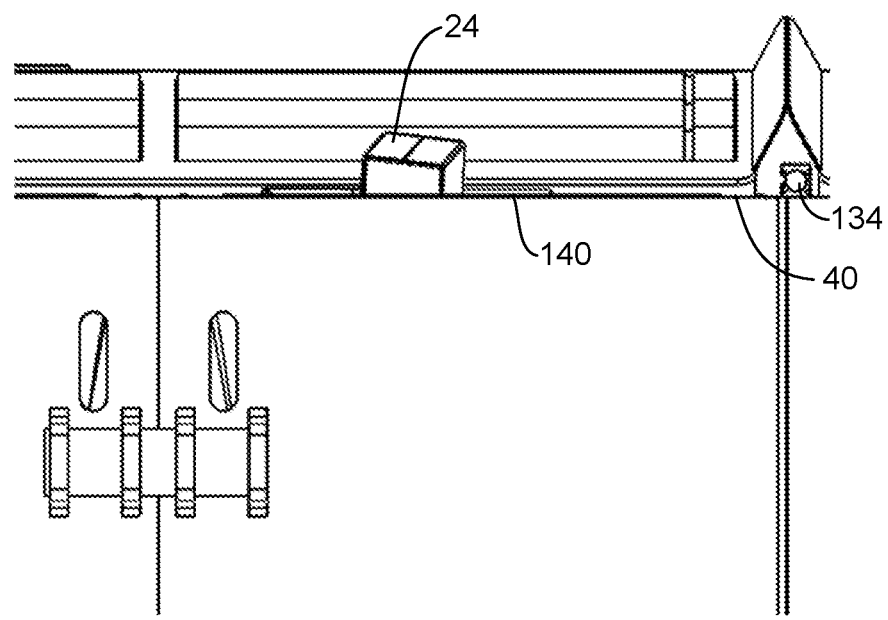
FIG. 15 is an enlarged elevation view of the discharge of FIG. 14 showing the detection of a received parcel protruding above the rim of the bag.

FIG. 14 shows the selective diversion of parcels 24 from the diverting conveyor 22 and into a designated bag 30. The closed enclosure doors 126 hold the carts 32 in place as parcels 24 are deposited in the bags 30. The discharges 28 can use powered rollers 122 for greater throughput. The speed of the rollers 122 can be varied to help distribute the parcels 24 in the bags 30. The floor 42 is tilted downward away from the discharge side 131 of the bag 30 and toward the far side 132. So parcels 24 landing near the discharge side 131 of the bag 30 roll or slide away toward the other side for better parcel distribution in the bag. Parcel detectors in the form of light-curtain transmitter 134 and receiver 135 pairs are mounted along sides of the enclosures 124 to detect received parcels 24 that protrude above the top rim 40 of the bags 30. The transmitter 134 transmits a parallel stream of light beams in a plane to the receiver 135. Any persistent interruption in the beams indicates that a parcel is protruding above the top rim 40 of the bag and blocking some portion of the beams. As shown in FIG. 15, a parcel 24 blocks some of the beams in the light curtain along a line of detection 140 slightly above the top rims 40 of the bags. When a protruding received parcel is detected, the controller, which receives a package detected signal from the light-curtain receiver, can signal the bag's mover to lower the floor or can set an alarm or other indicator for an operator to manually lower the floor with the foot pedal.

Figure 16:
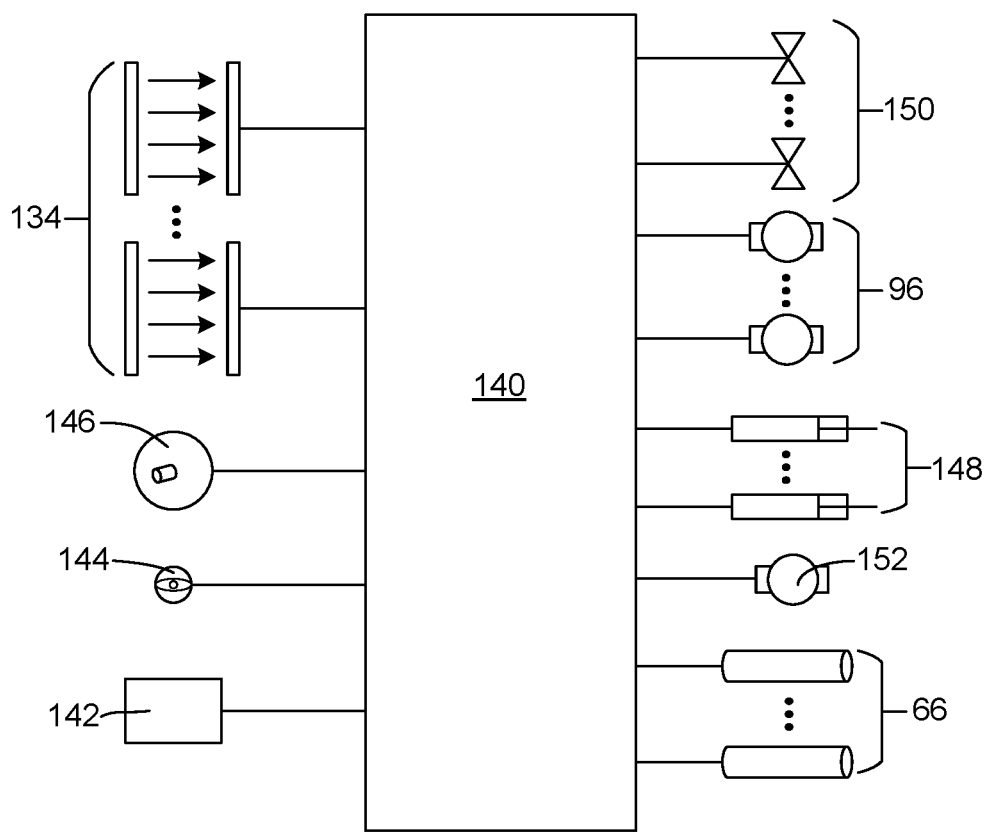
FIG. 16 is a block diagram of one version of a control system for the sorting conveyor system of FIG. 1.

One version of a control system for a sorting conveyor system as in FIG. 1 is shown in FIG. 16. The sorting system's controller 140, which can be a programmable logic controller or other programmable processing device or network of distributed programmable devices, receives identifying information on each parcel from a reader 142. From the identifying information, the controller 140 assigns a destination discharge for the parcel. A photo-eye sensor 144 or other parcel position sensor along the diverting conveyor (22, FIG. 1) upstream of the first sorter discharge detects the parcel at the photo-eye's detection point on the diverting conveyor. The photo-eye 144 sends a signal to the controller 140 indicating that the parcel is at the photo-eye's detection position. The controller 140, with knowledge of the distance of the assigned destination discharge from the photo-eye's detection position, calculates the number of shaft-encoder pulses that correspond to the distance to the assigned destination discharge. The shaft encoder 146 is mounted on either the drive shaft or the idle shaft of the diverting conveyor in the case of a belt conveyor. (In a powered-roller conveyor the speed of the rollers or a series of position sensors along the length of the diverting conveyor can be used to determine when to divert a parcel. In a shoe sorter controllable divert switches in the carryway guide the shoes to divert parcels to their assigned destinations.) When the controller 140 counts the calculated number of pulses received over a signal line from the encoder 146, it activates a diverting mechanism 148 at the assigned destination discharge to divert the parcel onto the assigned discharge. (In the case of a roller belt diverting conveyor, the diverting mechanism 148 includes actuating rollers below the belt that cause the parcel-supporting belt rollers to divert the parcel when the activating rollers are actuated by a signal from the controller 140.)

The controller 140 may also control the speed, including the starting and stopping of the discharge rollers 66, so that parcels follow desired trajectories into the bags. The light curtains 134 send signals to the controller 140 indicating that a received parcel is protruding above the top rims of the bags. Upon receiving such signals, the controller 140 opens valves 150 corresponding to the bags with protruding parcels in the case of a pneumatic system or operates the winch motors 96 through their motor controllers in the case of a winch system to lower those bags' floors to make room for more parcels. The controller 140 also keeps track of the floor level. When the floor of a bag is at its bottom-most position and the light curtain indicates a protruding parcel, the controller indicates a full bag that must be removed from the enclosures, replaced, and emptied. And the controller 140 controls the speed of the belt's drive motor 152.

What is claimed is:

1. A cart for receiving parcels, comprising:
   a base;
   a frame upstanding from the base;
   a bag supported by the frame and having flexible sides attached at a bottom to a rigid lower floor and having a top rim bounding a mouth opening into an interior volume between the top rim and the lower floor;
   a mover attached to the rigid lower floor to move the entire rigid lower floor vertically toward and away from the top rim to adjust the depth of the interior volume of the bag.

2. The cart as claimed in claim 1 wherein the rigid lower floor has an upper face that is tilted off horizontal.

3. The cart as claimed in claim 1 wherein the rigid lower floor includes rollers that extend into the interior volume.

4. The cart as claimed in claim 1 wherein the rigid lower floor is a ramp.

5. A cart for receiving parcels, comprising:
   a base;
   a frame upstanding from the base;
   a bag supported by the frame and having flexible sides attached at a bottom to a rigid lower floor and having a top rim bounding a mouth opening into an interior volume between the top rim and the lower floor;
   a mover comprising springs attached to the rigid lower floor and to the frame proximate the top rim to move the entire rigid lower floor vertically toward the top rim to adjust the depth of the interior volume of the bag.

6. The cart as claimed in claim 5 wherein the rigid lower floor is moved away from the top rim by the weight of parcels loaded into the interior volume acting against the bias of the springs.

7. A cart for receiving parcels, comprising:
a base;
a frame upstanding from the base;
a bag supported by the frame and having flexible sides attached at a bottom to a rigid lower floor and having a top rim bounding a mouth opening into an interior volume between the top rim and the lower floor;
a mover attached to the rigid lower floor to move the rigid lower floor toward or away from the top rim to adjust the depth of the interior volume of the bag;
wherein the bag is made of a material resilient enough to be stretched by the mover from an unstretched state as it moves the rigid lower floor away from the top rim;
wherein the mover comprises a winch including a motor, a pulley driven by the motor, and a cable wound on the pulley and extending to the rigid lower floor of the bag to move the rigid lower floor away from the top rim by stretching the bag to the increase the depth of the interior volume;
wherein, as the weight of parcels in the interior volume decreases, the bag returns toward its unstretched state allowing the rigid lower floor to move toward the top rim and decrease the depth of the interior volume.

8. The cart as claimed in claim 1 wherein the mover comprises a scissor lift connected between the base and the rigid lower floor of the bag to raise and lower the rigid lower floor to adjust the depth of the interior volume.

9. The cart as claimed in claim 8 wherein the scissor lift includes a Scott-Russell linkage.

10. The cart as claimed in claim 1 wherein the mover includes a pneumatic actuator.

11. The cart as claimed in claim 1 comprising a foot pedal attached to the base and to the mover to manually control the mover to move the rigid lower floor to adjust the depth of the interior volume.

12. The cart as claimed in claim 1 comprising a receiver coupled to the mover receiving signals to adjust the depth of the interior volume and sending those signals to the mover to move the rigid lower floor accordingly.

13. A conveyor system for sorting parcels, comprising:
a diverting conveyor conveying parcels along its length;
a plurality of discharges having entrance and exit ends and disposed along one or both sides of the diverting conveyor at spaced apart discharge locations along the length of the diverting conveyor to receive parcels diverted from the diverting conveyor over the entrance end and discharge the parcels off the exit end;
a plurality of carts positioned proximate the exit ends of the discharges to receive parcels discharged from the discharges over the exit ends, wherein the carts each include a bag having a top rim and flexible sides attached at a bottom to a rigid lower floor that is entirely movable vertically toward and away from the top rim to adjust the depth of an interior volume of the bag as a function of the volume of parcels in the bag.

14. The conveyor system as claimed in claim 13 wherein the discharges are tilted with the exit end below the entrance end.

15. The conveyor system as claimed in claim 13 wherein the discharges comprise powered roller conveyors.

16. The conveyor system as claimed in claim 15 wherein the powered roller conveyors each include a hinge at the entrance end that allows the powered roller conveyor to be tilted from a first position in which the exit end is at a first level for depositing the parcels in the associated cart to a second position in which the exit end is at a lower second level for maintenance.

17. The conveyor system as claimed in claim 13 comprising a parcel detector positioned at each cart to detect the presence of a parcel that extends above the top rim of the bag.

18. The conveyor system as claimed in claim 17 wherein the parcel detector comprises a light curtain at the level of the top rim.

19. The conveyor system as claimed in claim 17 comprising a controller and wherein the parcel detector sends a signal to the controller indicating the presence of a received parcel extending above the top rim of the bag.

20. The conveyor system as claimed in claim 19 wherein the cart includes a mover coupled to the rigid lower floor and wherein controller sends a signal to the mover to move the rigid lower floor to adjust the depth of the interior volume of the bag.

21. The conveyor system as claimed in claim 13 comprising stationary walled enclosures for the carts, each enclosure having a door and wherein the cart is positioned between the door and the exit end of the discharge to receive parcels.

22. The conveyor system as claimed in claim 21 wherein the cart includes a mover that moves the rigid lower floor and a foot pedal coupled to the mover to control the mover to move the rigid lower floor to adjust the depth of the interior volume of the bag and wherein the door includes a slot through which the foot pedal extends when the door is closed.

23. The conveyor system as claimed in claim 22 wherein the mover is pneumatically operated.

* * * * *